United States Patent [19]

Kilp

[11] 3,855,447

[45] Dec. 17, 1974

[54] WELD ADDITIVE FOR ELECTRIC-ARC DEPOSIT WELDING

[75] Inventor: Frithjof Ernst Josef Kilp, Viersen, Germany

[73] Assignee: Herman C. Starck, Berlin, Germany

[22] Filed: May 21, 1973

[21] Appl. No.: 296,654

[52] U.S. Cl. ............................... 219/145, 219/146
[51] Int. Cl. ............................................ B23k 35/00
[58] Field of Search ............ 219/145, 146, 137, 73; 75/176; 106/56, 66, 43

[56] References Cited
UNITED STATES PATENTS

| | | | |
|---|---|---|---|
| 1,876,411 | 9/1932 | Gregg et al. | 219/145 X |
| 3,466,422 | 9/1969 | Witherell | 219/146 |
| 3,583,471 | 6/1971 | Kemming | 219/145 X |
| 3,592,999 | 7/1971 | Quaas | 219/146 |
| 3,603,763 | 9/1971 | Juzvenko et al. | 219/146 |
| 3,617,358 | 11/1971 | Dittrich | 106/43 UX |

Primary Examiner—J. V. Truhe
Assistant Examiner—G. R. Peterson
Attorney, Agent, or Firm—Karl F. Ross; Herbert Dubno

[57] ABSTRACT

A welding additive for incorporation into electric-arc welding rod, e.g. of the coated or core type, contains chromium carbide with superstoichiometric quantities of carbon in the lattice of the chromium carbide to ensure a carbon content of 15 to 25 percent by weight. Preferably the additive is a low-melting hypereuctectoid of $Cr_3C_2$ and elemental carbon. The additive improves the wear resistance and frictional characteristics of a deposit weld by imparting to its characteristics which have hitherto been associated only with high-carbon deposites of autogenous welding.

3 Claims, No Drawings

WELD ADDITIVE FOR ELECTRIC-ARC DEPOSIT WELDING

FIELD OF THE INVENTION

The present invention relates to a welding additive and, more particularly, to a weld additive adapted to be incorporated in original or altered form in an electric-arc deposition weld.

BACKGROUND OF THE INVENTION

In welding it is a common practice to apply a weldment or weld material to a metal substrate or workpiece by melting a filler or other rod or tube containing the material to be deposited. In general, the rod or wire may be coated with fluxing materials, alloying materials or substances which facilitate the formation of the weld or impart specific properties to the deposited weld material. Alternatively, or in addition, the rod or wire may be tubular, i.e. provided with a core containing such additives or materials. The rod can generally be described as tubular or coated wire or rod electrodes when the system uses the electric-arc process of melting the weld materials and heating the workpiece to a degree sufficient to enable a metallic bond between the substrate and the pool of molten weld material deposited thereon.

In electric-arc deposit welding, the tubular or coated wire or electrode rod and the workpiece are relatively displaced while an electric arc is struck between the electrode and the workpiece. The arc is of a temperature sufficient to melt the electrode, which is continuously fed to the arc, and to melt a portion of the workpiece material in the region of the arc, the molten metal of the workpiece and the substrate merging to form the weld deposit.

It is advantageous to provide weld deposits having a high carbon concentration, a result that is counteracted by the very nature of the electric arc. In spite of the fact that the tubular or coated electric wire may contain graphite or carbon or carbon-containing compounds, it has been found that the high temperature of the electric arc causes a burn-off of carbon both in the material to be deposited and in the substrate material which is subjected to the effect of the arc.

It is desirable, as noted, to obtain a product which has a high carbon content because this reduces the wear of the deposited surface, increases hardness, positively affects the frictional characteristics thereof and otherwise improves the quality of the deposited weldment. Hence when deposit welding was to be carried out in such manner as to yield a deposit having a high carbon concentration, recourse was had to autogenous welding techniques in which a wire or rod of the deposited material was fed to a region of the workpiece or substrate heated by a gas flame. When the gas flame is a reducing acetylene flame, there is a reduction or elimination of carbon burn-off and frequently an increase in the carbon content of the deposit weld from carbon of the fuel. However, autogenous or acetylene welding is not always desirable or convenient.

OBJECTS OF THE PRESENT INVENTION

It is the principal object of the present invention to provide a weld additive which may be incorporated in welding rod or wire for electric-arc deposit welding whereby the aforementioned disadvantages may be obviated.

Another object of the invention is to provide a weld additive capable of increasing the carbon content of electric arc deposit welds in spite of the high tendency of arc-welding techniques to burnoff available carbon.

SUMMARY OF THE INVENTION

These objects and others are attained, in accordance with the present invention, by a weld additive for incorporation in the coatings and cores of coated or tubular wire electrodes for arc welding and which may also be deposited upon the weld site as a welding powder, e.g. in the case of submerged-arc welding, the additive consisting of chromium carbide with a superstoichiometric proportion of carbon so as to have a carbon content ranging from 15 to 25 percent by weight.

It has long been sought to provide, in an electric-arc deposition welding system, a composition which will limit the tendency of carbon to be burnt off and which will impart to the finished weld, the quality of graphite and carbon-containing welds hitherto attainable only with such autogenous techniques as the use of a reducing acetylene flame. The problem was engendered by the fact that the electric arc generates temperatures of a minimum of 5000°C, i.e. well above those of the acetylene flame, so that any available graphite and carbon is rapidly oxidized and made no longer available for incorporation in the deposited weld. Furthermore, with conventional electric-arc systems, the inhomogeneities of the elctrode-wire core and the differences in specific gravity of the materials present in the molten-metal pool at the arc, require that the arc be maintained for a relatively long period without moving so that the weld can be homogenized. As a result, the substrate and weld material are exposed to the above-mentioned elevated temperatures for relatively long periods. The long-duration application of high temperatures is a further factor in the carbon burn-off and reduction in quality of the weld.

A reduction in the carbon content of the deposit corresponds to reduction in the hardness and wear characteristics thereof. Thus, while it is desirable to obtain a high carbon content at the weld, this could not be achieved with conventional arc-welding techniques.

It should also be mentioned that it has been proposed to use, at the welding site, a spray powder consisting of a chromium carbide. The product was relatively expensive and was unable fully to overcome the disadvantages of electric-arc deposit welding in terms of the carbon content of the deposit and was unable to make the latter comparable to an acetylene weld.

The new composition of the invention described above, however, economically permits electric-arc-deposit welding to be carried out to yield a deposit having a high carbon content with wear and hardness characteristics comparable favorably with those of an acetylene weld.

More particularly it has been found that is is possible to eliminate the aforedescribed disadvantages with a chromium carbide of the $Cr_3C_2$ stoichiometric structure which includes elemental carbon deposited or embedded therein. The composition, according to the invention, thus comprises a weld additive for electric arc-deposit welding which contains carbon as an alloying, hardening or other agent in an elemental form above and beyond the chemically bound carbon of the stoichiometric chromium carbide $Cr_3C_2$, the elemental carbon being incorporated in the lattice of the chromium carbide as a deposit or embedded material. The weld additive may be formed by dissolving carbon in chromium and cooling the melt to produce a solid solution from which a portion of the carbon may be precipitated although it remains locked in the lattice structure, by depositing carbon upon and thermally diffusing into metallic chromium, or by treating the stoichiometric chromium carbide with carbon and then effecting a thermal diffusion of carbon into the lattice structure. All of these techniques are well known in the art. The elemental carbon may be present as a low-melting-point hypereutectoid or alloy with part of the $Cr_3C_2$ as a microstructure within the matrix formed by the balance of the $Cr_3C_2$ but not part of the crystalline lattice thereof.

The stoichiometric $Cr_3 C_2$ contains carbon in an amount of about 13.3 percent by weight and it is preferred that the additive of the present invention should contain 15 to 25 percent by weight carbon. Investigations have shown that a carbon content of about 19 percent by weight provides the most effective results.

While I do not wish to be bound by any theory regarding the efficacy of the present system, it is my belief that the stoichiometric chromium carbide lattice, apart from introducing carbon into the deposited material from its own crystalline structure, is a refractory material in which the deposited or embedded elemental carbon remains trapped and shielded against burn-off even at the high temperatures of the electric arc, until the crystalline material is dissolved in the pool of molten metal. At this point the elemental carbon may be released and dissolved, alloyed or otherwise incorporated in the weld deposit. The carbide protects the elemental carbon for a relatively long period while the additive is in contact with the melt and is fully homogeneous so that problems of inhomogeneity arising with the cores or fillers or earlier weld wires, are avoided. The elemental carbon is uniformly distributed as free carbon, imbedded in the metal-carbide matrix.

The additive can be employed in practically any coated or cored wire and may be used with any weld-wire material of conventional composition, the latter being selected in accordance with the workpiece to be welded. The improvement in wear characteristics is found for frictional, impact and abrasive wear.

SPECIFIC EXAMPLES

In the following examples, the additive of the present invention is a hypereuctectoid of low-melting solid of part of the elemental carbon with $Cr_3 C_2$ containing 19 percent by weight carbon, the excess above the stoichiometric quantity of carbon being in the form of elemental carbon dispersed in the $Cr_3 C_2$ lattice in the form of free carbon. In the Examples 4 and 5 the chromium carbide content is at most 10 percent carbon. In each Example, the carbon content of the welding wire is given together with the carbon content of the deposited weld, the loss of carbon being given in percent of the carbon content of the weld wire. Examples are given for welds made under air or a carbon dioxide protective atmosphere. Examples 4 and 5 are for the purpose of comparison and all values are percent by weight. The carbon loss with the electrodes of the present invention can be seen to be be much higher than the carbon loss with the conventional system (Examples 4 and 5)

EXAMPLE I

| | |
|---|---|
| Wire (welding in air) | 5.4 C total (with Cr-C with 19% C) |
| in weld material | 5.1% C |
| loss | 0.3% C = 5.5% |

EXAMPLE II

| | |
|---|---|
| Wire (welding under $CO_2$ protective atmosphere) | 4.9% C total (with Cr-C with 19% C) |
| in weld material | 4.3% C = 12% |
| loss | 0.6% C – |

EXAMPLE III

| | |
|---|---|
| Wire (welding under $CO_2$ | 4.1% C total (with Cr-C with 19% C) |
| in weld material | 3.7% C |
| loss | 0.4% = 10% |

EXAMPLE IV

| | |
|---|---|
| Wire (welding under $CO_2$) | 2.2% C (with Cr-C with 9% C) |
| | 2.6% C (with Graphite) |
| | 4.8% total |
| in weld material | 3.2% C |
| loss | 1.6C = 33% |

EXAMPLE V

| | |
|---|---|
| Wire (welding in air) | 1.4% C (with Cr-C with 9% C) |
| | 3.2% (with Graphite) |
| | 4.6% total |
| in weld material | 3.2% C |

I claim:

1. In a welding rod or wire, an improved weld additive for electric-arc deposition welding consisting essentially of the stoichiometric chromium carbide $Cr_3C_2$ with superstoichiometric quantities of elemental carbon distributed in the lattice of the $Cr_3C_2$ to ensure a carbon content of 15 to 25 percent by weight in the additive.

2. The additive defined in claim 1 wherein the elemental carbon forms a low-melting point euctectoid with a portion of the $Cr_3C_2$; the remainder of the $Cr_3C_2$ constituting hypereuctectoid chromium carbide dispersed as a microstructure in a matrix of the euctectoid.

3. The additive defined in claim 2 which has a carbon content of 19 percent.

* * * * *